Dec. 22, 1959    C. H. LUNSFORD    2,918,566
RETRACTIBLE EMERGENCY LIGHT
Filed June 18, 1958
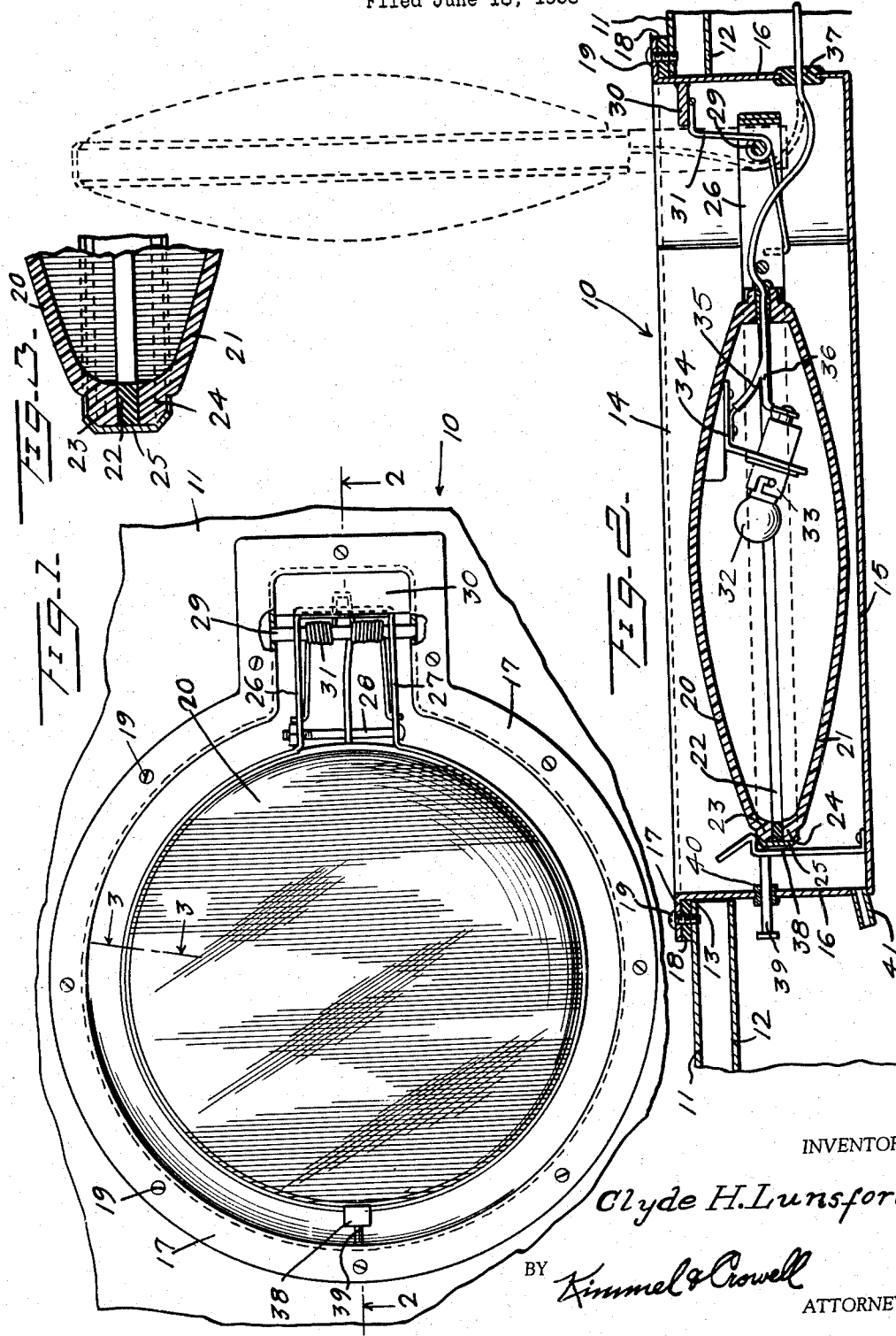
INVENTOR
*Clyde H. Lunsford*
BY *Kimmel & Crowell*
ATTORNEYS

United States Patent Office 2,918,566
Patented Dec. 22, 1959

2,918,566

RETRACTIBLE EMERGENCY LIGHT

Clyde H. Lunsford, Covington, Ky.

Application June 18, 1958, Serial No. 742,795

2 Claims. (Cl. 240—7.1)

The present invention relates to retractible emergency lights, and particularly to such lights mounted on a motor vehicle.

The primary object of the invention is to provide an emergency light on motor vehicles which is normally retracted into the roof of the motor vehicle and can be released to extend upwardly therefrom.

Another object of the invention is to provide an emergency light of the class described which is visible from both in front of and to the rear of the vehicle when the emergency light is in its erected position.

A further object of the invention is to provide an emergency light for motor vehicles which is inexpensive to manufacture, simple to attach, and which can be easily released to extend to erected position.

Other objects and advantages will become apparent in the following specification when considered in the light of the attached drawings, in which:

Figure 1 is a top plan view of the invention.

Figure 2 is an enlarged fragmentary vertical section taken along the line 2—2 of Figure 1, looking in the direction of the arrows, with the erected position of the light shown in dotted lines.

Figure 3 is an enlarged fragmentary vertical section taken along the line 3—3 of Figure 1, looking in the direction of the arrows.

Referring now to the drawings in detail wherein like reference characters indicate like parts throughout the several figures, the reference numeral 10 indicates generally an emergency light for motor vehicles constructed in accordance with the invention.

The emergency light 10 is positioned centrally of the top of a motor vehicle, a portion of the top being shown at 11. The top 11 is of sheet material and is upholstered with a headliner 12 positioned therebelow.

The top 11 has an opening 13 cut therein to receive the emergency light 10 which is recessed within the top 11 of the motor vehicle.

The emergency light 10 includes a pan 14 having a bottom wall 15 and a peripheral side wall 16 connected thereto. A flange 17 is formed integrally on the upper edge of the side wall 16 and extends perpendicularly outwardly therefrom. The pan 14 extends into the opening 13 in the roof 11 with the flange 17 separated from the roof 11 by a seal 18. Securing elements 19 secure the flange 17 to the top 11, as can be best seen in Figure 2.

A pair of domed lenses 20, 21 are positioned in confronting relation and separated by a sealing gasket ring 22 positioned therebetween. The domed lenses 20, 21 are each provided with a peripheral radial flange 23, 24, respectively, and a flexible annular channel ring 25 engages peripherally the flanges 23, 24 to secure the lens 20 to the lens 21, as best shown in Figure 3. The channel 25 is provided with spaced apart outwardly extending parallel portions 26, 27 which are connected adjacent the flanges 23, 24 by means of a bolt 28 by means of which the channel 25 can be tightened about the lenses 20, 21.

A pivot pin 29 extends through the side wall 16 and through the outer end portions of the extensions 26, 27 to pivotally secure the lenses 20, 21 to the pan 14. A spring seat bar 30 is secured to the side wall 16 adjacent to and above the pivot pin 29 to anchor one end of a coil spring 31 mounted on the pivot pin 29 and engaging the extensions 26, 27 at the other end. The coil spring 31 normally biases the lenses 20, 21 to the dotted line position illustrated in Figure 2.

A light bulb 32 is supported between the lenses 20, 21 in a socket 33 secured to a bracket 34 mounted to the lens 20. Electric wires 35, 36 extend from the socket 33 and out of the pan 14 through a sealing grommet 37.

The lenses 20, 21 are normally maintained in lowered position, as shown in full lines in Figure 2, by means of a spring detent 38 which engages over the flange 23 in the manner illustrated in Figure 2. A handle 39 is secured to the spring detent 38 and passes through a sealing grommet 40 to permit the spring detent 38 to be released from within the motor vehicle without permitting leakage of fluid from the pan 14 to pass therein.

A drain spout 41 is formed on the lower end of the pan 14 and is adapted to have a flexible tubing (not shown) connected thereto to drain fluid from the pan 14 through the floor of the vehicle.

In the use and operation of the invention, the lenses 20, 21 are normally carried within the pan 14 so that the police car, ambulance, or other emergency vehicle may normally operate without the emergency light structure being visible. When it is desired that the emergency light be visible, the driver of the emergency vehicle can pull the handle 39, retracting the spring detent 38, so that the spring 31 can move the lenses 20, 21 to their raised position. The light bulb 32 between the lenses 20, 21 may either be operated by a separate hand controlled switch or may be automatically operated by switches such as mercury switches.

It should be understood, of course, that the light bulb 32 can be caused to flash in the same manner that emergency lights are presently flashed.

When the emergency has ceased to exist, the lenses 20, 21 may be returned to their retracted position within the pan 14 by hand pressure, and the spring detent 38 will automatically snap over the flange 23 to releasably lock the lenses 20, 21 in their lowermost position. Water collecting in the pan 14 will drain therefrom through the drain spout 41 to prevent the emergency light 10 from becoming damaged due to the water contact therewith.

Having thus described the preferred embodiment of the invention, it should be understood that numerous structural modifications and adaptations may be resorted to without departing from the scope of the appended claims.

What is claimed is:

1. A retractible emergency light for emergency vehicles comprising an open top watertight pan, an outwardly extending flange integrally formed on the upper edge of said pan, means for securing said flange in sealed relation to the top of a vehicle with said pan recessed within the top of the vehicle, a water drain outlet conduit secured to the bottom portion of said pan for draining water therefrom, a light bulb, means mounting said light bulb in said pan for pivotal movement from a retracted position within said pan to an extended position above said pan, a spring normally biasing said light bulb toward its extended position above said pan, and a latch manually releasable from within said vehicle for normally retaining said light bulb within said pan.

2. A device as claimed in claim 1 wherein a pair of lenses are positioned on opposite sides of said light bulb, a peripheral flange integrally formed on each of said lenses, an annular channel member clampingly engaging said peripheral flanges securing said lenses together in sealed relation with respect to each other, with the means mounting said light bulb in said pan pivotally connected to said annular channel member.

References Cited in the file of this patent

UNITED STATES PATENTS

| 1,347,011 | Cochran | July 20, 1920 |
| 1,473,400 | Dunn | Nov. 6, 1923 |
| 2,557,872 | Holland | June 19, 1951 |
| 2,739,224 | Knapp | Mar. 20, 1956 |
| 2,831,960 | Heiser | Apr. 22, 1958 |

FOREIGN PATENTS

| 513,880 | Great Britain | Oct. 24, 1939 |